No. 825,849. PATENTED JULY 10, 1906.
F. A. LOHMANN.
COOKY MOLD AND CUTTER.
APPLICATION FILED FEB. 26, 1906.
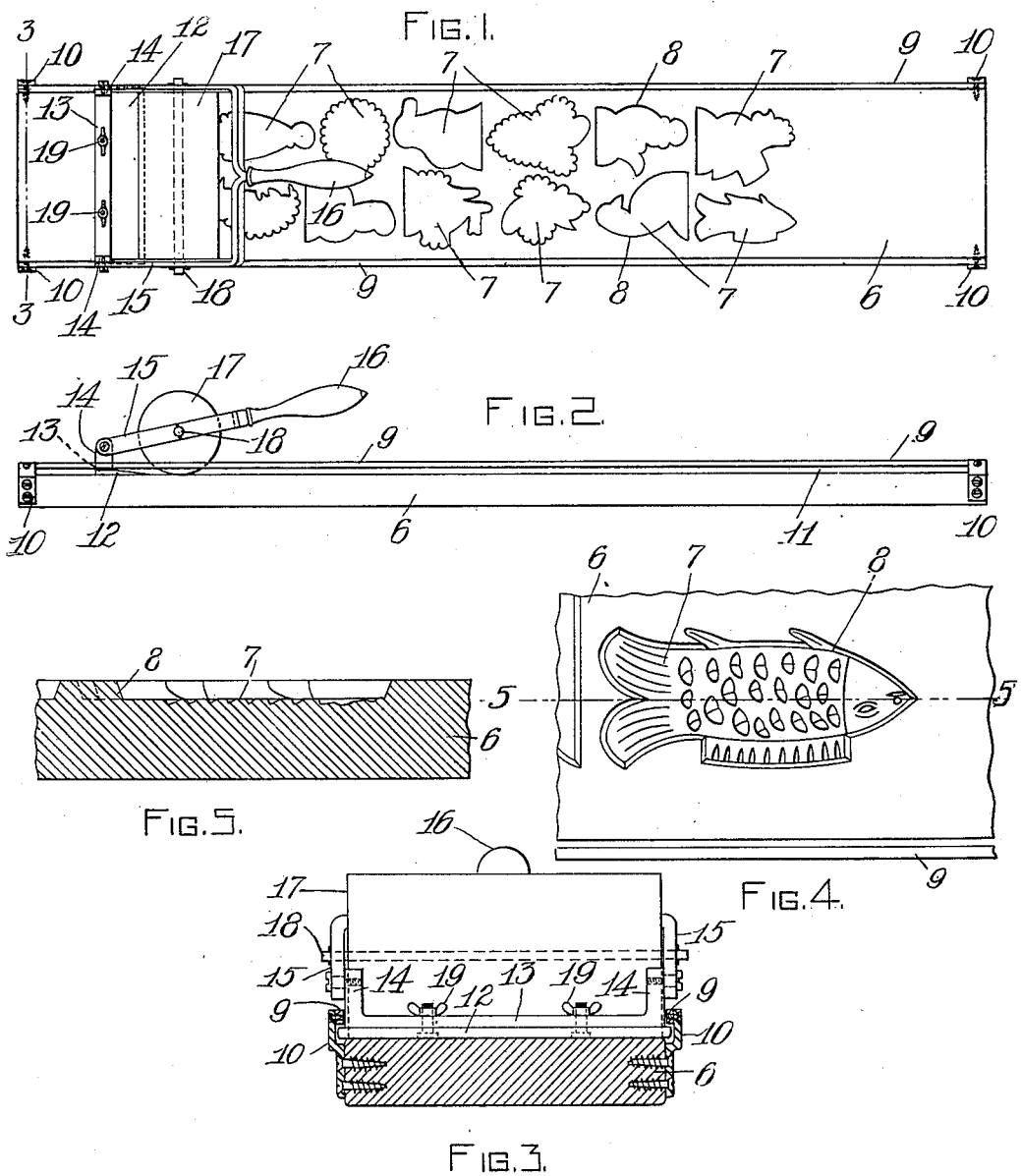
WITNESSES: INVENTOR=

UNITED STATES PATENT OFFICE.

FRANK A. LOHMANN, OF BOSTON, MASSACHUSETTS.

COOKY MOLD AND CUTTER.

No. 825,849.

Specification of Letters Patent.

Patented July 10, 1906.

Application filed February 26, 1906. Serial No. 302,869.

*To all whom it may concern:*

Be it known that I, FRANK A. LOHMANN, a citizen of the United States, residing at Boston, in the county of Suffolk and State of Massachusetts, have invented new and useful Improvements in Cooky Molds and Cutters, of which the following is a specification.

The object of this device is to provide a device for molding and cutting cookies, the object of the invention being further to provide a device in which a number of cookies of different sizes, shapes, or designs may be rolled, molded, and sliced or cut off upon the under face thereof at one time, thus providing a device which while cheap and easy to manipulate produces a cooky of a certain thickness and very much increases the number of cookies which can be produced in a given time, besides forming said cookies into different shapes, such as leaves, faces, animals, and any design or variation of contour which may be desired.

The invention consists in the combination and arrangement of parts set forth in the following specification and particularly pointed out in the claims thereof.

Referring to the drawings, Figure 1 is a plan view of my improved cooky mold and cutter. Fig. 2 is a front elevation of the same. Fig. 3 is a section, partly in elevation, taken on line 3 3 of Fig. 1 looking toward the right in said figure. Fig. 4 is a plan view of a portion of the mold-board and one of the recesses to receive and mold the cooky. Fig. 5 is a section taken on line 5 5 of Fig. 4.

Like numerals refer to like parts throughout the several views of the drawings.

In the drawings, 6 is a mold-board provided in its upper face with a plurality of recesses 7 7, preferably of different shapes and designs, some illustrating heads, others leaves, fishes, animals, &c. These recesses are so shaped as to be adapted to receive and mold plastic material, such as dough for cookies, and have their side walls 8, Fig. 5, beveled or inclined in order that the dough after being rolled into the recesses and cut off, as hereinafter described, may be easily removed from the mold-board. To each side of the mold-board 6 is fastened a guide-plate 9 by means of brackets 10, which are screwed to the sides of said mold-board and securely fastened to the guide-plates 9. The guide-plates 9 are located above the upper surface of the mold-board 6, thus providing slots 11 between the lower face of said guide-plates and the upper face of said mold-board. These slots afford a means for guiding the knife 12, fastened to a knife-carrier 13, extending transversely across said mold-board and having at its opposite ends ears 14, projecting upwardly therefrom, to which is pivoted a forked lever 15, having a handle 16 at one end thereof. A roller 17 is fastened to a shaft 18, which is journaled to rotate in said lever 15. The brackets 10 are offset at their upper ends, Fig. 3, to allow the knife-carrier and the knife attached thereto to pass by said brackets and be withdrawn from the slots 11 when it is desired to clean or sharpen said knife. The knife 12 is attached to the carrier 13 by thumb-nuts 19, so that said knife may be readily removed from the carrier when it is desired to clean or sharpen the same.

The mode of operation of my improved cooky mold and cutter is as follows: The dough is placed upon the top of the mold-board 6 and is then rolled into the recesses 7 by means of the roller 17, which is moved toward the right from the position shown in Figs. 1 and 2 by means of the handle 16 and lever 15. The roller 17 is immediately adjacent to the cutting edge of the knife 12 and moves in advance thereof, rolling the dough into the recesses 7. All of the excess dough which projects beyond the upper face of the mold-board 6 will be sliced off by the knife 12 as it moves along in the rear of the roller 17. When the roller and the knife have been moved to the extreme right, Figs. 1 and 2, all of the cookies will have been rolled into the recesses and molded into shape and also sliced off flush with the upper face of the mold-board by the knife 12. The mold-board is then inverted and the cookies dropped out of the recesses upon a suitable table or board.

Having thus described my invention, what I claim, and desire by Letters Patent to secure, is—

1. In a device of the character described, a moldboard provided in its upper face with a plurality of recesses adapted to receive and mold plastic material, a knife-carrier slide, a knife fast to said slide and adapted to cut off said plastic material flush with said face, a lever pivoted to said slide, and a roll journaled on said lever and located adjacent to and in advance of the cutting edge of said knife, whereby said plastic material is rolled into said recesses and cut off flush with said upper face.

2. In a device of the character described, a mold-board provided in its upper face with a plurality of recesses, adapted to receive and mold plastic material, and a guide-plate provided with a slot extending longitudinally of said mold-board in alinement with the upper face thereof.

3. In a device of the character described, a mold-board provided in its upper face with a plurality of recesses adapted to receive and mold plastic material, a guide-plate provided with a slot extending longitudinally of said mold-board in alinement with the upper face thereof, and a knife guided by said slot, whereby said plastic material may be cut off flush with said upper face.

4. In a device of the character described, a mold-board provided in its upper face with a plurality of recesses adapted to receive and mold plastic material, a guide-plate provided with a slot extending longitudinally of said mold-board in alinement with the upper face thereof, a knife guided by said slot, whereby said plastic material may be cut off flush with said face, and a roll movable with said knife and adapted to be moved longitudinally over the upper face of said mold-board.

In testimony whereof I have hereunto set my hand in presence of two subscribing witnesses.

FRANK A. LOHMANN.

Witnesses:
   LOUIS A. JONES,
   ANNIE J. DAILEY.